US009307279B2

(12) United States Patent
Jung et al.

(10) Patent No.: US 9,307,279 B2
(45) Date of Patent: *Apr. 5, 2016

(54) DIGITAL BROADCASTING RECEIVING APPARATUS WITH IMPROVED START-UP SPEED AND START-UP METHOD FOR THE DIGITAL BROADCASTING RECEIVING APPARATUS

(71) Applicant: SAMSUNG ELECTRONICS CO., LTD., Suwon-si (KR)

(72) Inventors: Choon-sik Jung, Hwaseong-si (KR); Kang-wook Chun, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/761,168

(22) Filed: Feb. 7, 2013

(65) Prior Publication Data

US 2013/0148032 A1 Jun. 13, 2013

Related U.S. Application Data

(63) Continuation of application No. 11/773,486, filed on Jul. 5, 2007, now Pat. No. 8,392,944.

(30) Foreign Application Priority Data

Dec. 29, 2006 (KR) ........................ 10-2006-0138779

(51) Int. Cl.
*G06F 3/00* (2006.01)
*H04N 7/173* (2011.01)
(Continued)

(52) U.S. Cl.
CPC ............ *H04N 21/426* (2013.01); *G06F 9/4403* (2013.01); *H04N 5/4401* (2013.01); *H04N 21/4432* (2013.01)

(58) Field of Classification Search
USPC ...................... 725/38, 132, 142, 152; 713/1–2
See application file for complete search history.

(56) References Cited

U.S. PATENT DOCUMENTS 5,838,383 A * 11/1998 Chimoto et al. .............. 348/553
5,945,988 A    8/1999 Williams et al.
(Continued)

FOREIGN PATENT DOCUMENTS

CN       1678039 A       10/2005
JP    1999-308580 A      11/1999
(Continued)

OTHER PUBLICATIONS

Communication dated Mar. 21, 2013 from the State Intellectual Property Office of P.R. China in counterpart application No. 200710140981.X.
Communication dated Aug. 6, 2013 issued by the European Patent Office in counterpart European Application No. 07113065.2.
Communication from the Korean Intellectual Property Office dated Dec. 21, 2010, in Application No. 10-2006-0138779.
Communication from the State Intellectual Property Office of P.R. China dated Jan. 19, 2011, in Application No. 200710140981.X.
(Continued)

*Primary Examiner* — Gigi L Dubasky
(74) *Attorney, Agent, or Firm* — Sughrue Mion, PLLC

(57) ABSTRACT

A digital broadcasting receiving apparatus with improved start-up speed and a start-up method for the digital broadcasting receiving apparatus are provided. The start-up method for the digital broadcasting receiving apparatus includes performing a booting operation related to a central processing unit (CPU) when the digital broadcasting receiving apparatus is powered on, performing a channel decoding operation related to a channel to be displayed while the CPU booting is being performed, and displaying the channel decoded by the channel decoding operation when the CPU booting and the channel decoding are finished. Accordingly, the start-up time of the digital broadcasting receiving apparatus can be remarkably reduced.

17 Claims, 6 Drawing Sheets

(51) Int. Cl.
*H04N 7/16* (2011.01)
*G06F 9/00* (2006.01)
*H04N 21/426* (2011.01)
*G06F 9/44* (2006.01)
*H04N 5/44* (2011.01)
*H04N 21/443* (2011.01)

(56) References Cited

U.S. PATENT DOCUMENTS

| | | |
|---|---|---|
| 6,788,352 B2 * | 9/2004 | Kim .............................. 348/553 |
| 7,116,376 B2 | 10/2006 | Yun |
| 2002/0024616 A1 | 2/2002 | Kim |
| 2002/0073305 A1 | 6/2002 | Joseph et al. |
| 2003/0076346 A1 | 4/2003 | Yun |
| 2005/0074173 A1 * | 4/2005 | Lee et al. ...................... 382/232 |
| 2005/0160474 A1 | 7/2005 | Obitsu et al. |
| 2005/0223404 A1 * | 10/2005 | Ishiguro et al. ................. 725/38 |
| 2007/0028282 A1 | 2/2007 | Kooijimans et al. |

FOREIGN PATENT DOCUMENTS

| | | |
|---|---|---|
| KR | 10-1999-0055568 A | 7/1999 |
| WO | 2005/027508 A1 | 3/2005 |

OTHER PUBLICATIONS

Notice of Allowability issued by the Korean Patent Office on Aug. 24, 2011 in corresponding Korean Patent Application No. 10-2006-0138779.

Communication dated Oct. 29, 2012 from the State Intellectual Property Office of P.R. China in counterpart Chinese application No. 200710140981.X.

Communication issued Jan. 16, 2012 from the European Patent Office in counterpart European Application No. 07113065.2.

Communication dated Mar. 21, 2012 from the State Intellectual Property Office of P.R. China in a counterpart application No. 200710140981.X.

Communication dated Mar. 27, 2015, issued by the State Intellectual Property Office of P.R. China in counterpart Chinese Application No. 200710140981.X.

Communication dated Jul. 7, 2015, issued by the State Intellectual Property Office of P.R. China in counterpart Chinese Application No. 200710140981.X.

Communication dated Sep. 30, 2015, issued by the State Intellectual Property Office of P.R. China in counterpart Chinese Application No. 200710140981.X.

* cited by examiner

DIGITAL BROADCASTING RECEIVING APPARATUS WITH IMPROVED START-UP SPEED AND START-UP METHOD FOR THE DIGITAL BROADCASTING RECEIVING APPARATUS

CROSS-REFERENCE TO RELATED PATENT APPLICATION

This is a continuation application of U.S. application Ser. No. 11/773,486, filed Jul. 5, 2007, which claims priority from Korean Patent Application No. 10-2006-0138779, filed on Dec. 29, 2006 in the Korean Intellectual Property Office, the disclosure of which is incorporated herein in its entirety by reference.

BACKGROUND OF THE INVENTION

1. Field of the Invention

Methods and apparatuses consistent with the present invention relate to a digital broadcasting receiving apparatus, and more particularly, to a digital broadcasting receiving apparatus with improved start-up speed and a start-up method for the digital broadcasting receiving apparatus.

2. Description of the Related Art

As digital communication technologies have developed, broadcasting data based on media which use various compression techniques are more widely used. Additionally, because of digital convergence, in which one terminal performs various functions, receiving apparatuses receiving digital broadcasting data have become more diversified.

Digital broadcasting is a remarkable improvement over related art analog broadcasting in terms of the quality of images and sounds, and is data-compatible with various apparatuses such as a computer, a digital versatile disk (DVD), a digital camcorder and a digital personal video recorder that can process digital signals. Additionally, since digital broadcasting can provide a lot of additional information data in addition to sounds and images, user convenience can be remarkably improved. For example, multiplexed information can be transmitted during the vertical blanking period of a digital broadcasting receiving apparatus, or a larger amount of data can be broadcasted through additional channels. The data includes stop images, product information, electronic program guides (EPGs) or the like. Thus, a user can receive a lot of news information through digital broadcasting, and can receive the results of a sport game, securities information, whether information, traffic situation information or the like in real-time.

However, a predetermined operation is required after a digital broadcasting receiving apparatus is powered on in order to operate the digital broadcasting receiving apparatus. This is because a digital broadcasting receiving apparatus includes various electric modules therein, and the electric modules should be started through predetermined operations similar to booting a computer.

FIG. 1 is a view illustrating start-up time of a related art digital broadcasting receiving apparatus.

When a user turns on the digital broadcasting receiving apparatus in order to receive digital broadcasting, an operation is required for initializing an entire system of the digital broadcasting receiving apparatus. The system initializing operation may include testing and checking operations of a memory included in the digital broadcasting receiving apparatus, and an operation of determining an operation clock signal of the digital broadcasting receiving apparatus. That is, when the digital broadcasting receiving apparatus is powered on, an operation is required for initializing the digital broadcasting receiving apparatus in order to operate each device.

When hardware modules in the digital broadcasting receiving apparatus are initialized, an operating system (OS) is initialized in order to operate such hardware. During this operation, the OS stored in a read only memory (ROM) included in the digital broadcasting receiving apparatus is loaded, and a central processing unit (CPU) is prepared in order to be operated. Examples of the OS suited to the digital broadcasting receiving apparatus are a real time operating system (RTOS) or the like.

When the OS is initialized, various tasks that are to be performed in the digital broadcasting receiving apparatus are initialized. The tasks are various operations performed by the digital broadcasting receiving apparatus. For example, the tasks include a record storing function, audio decoding and reproducing functions, a channel decoding function, a display function or the like. That is, the tasks include a function applied in an upper level of the OS, or any operation that can be substantially performed by a user using the digital broadcasting receiving apparatus.

When the tasks are initialized, upper level applications using each task are set. The applications include every operation that can be performed using the task according to settings set by a user. Examples of applications include a display setting set by a user (luminosity, brightness, aspect ratio, or the like) and a sound level that is previously set when a user watches a digital broadcasting receiving apparatus. Alternatively, when a user sets an end time and a start time of the digital broadcasting receiving apparatus, the end time and start time are loaded by the application during start-up of the digital broadcasting receiving apparatus, and the digital broadcasting receiving apparatus displays an initial image using the loaded end time and start time.

When the application is set, an operation for locking a channel to be displayed is performed. The locked channel is decoded using a predetermined codec, and the decoded program is finally displayed to a user.

The widespread use of digital broadcasting receiving apparatuses means that users can easily acquire a lot of information. However, a long time is needed for start-up of the digital broadcasting receiving apparatus. In addition, a Linux based OS as well as the real time OS has been used as an OS of digital broadcasting receiving apparatuses. Since the initializing time is longer when the Linux-based OS is used than when the real time OS is used, the start-up time of the digital broadcasting receiving apparatus is greatly increased. Accordingly, a user who has to wait during start-up of the digital broadcasting receiving apparatus may feel bored and frustrated, since the start-up time is about 5 to 6 seconds or more. Thus, if a user wants to see an important sports game and starts the digital broadcasting receiving apparatus in order to see a desired relay broadcast, the user may lose an important scene during start-up.

Accordingly, there is a need for a method of improving the start-up time of a digital broadcasting receiving apparatus.

In addition, there is a need for a digital broadcasting receiving apparatus through which a user can receive a desired broadcast whenever the user wishes to receive the broadcast, by improving the start-up time.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a start-up method for a digital broadcasting receiving apparatus, which reduces the start-up time required for power on of the digital broadcasting receiving apparatus.

The present invention also provides a digital broadcasting receiving apparatus that increases start-up speed, and as such the digital broadcasting receiving apparatus is quickly started. This removes discomfort that a user can experience and improves user convenience.

According to an aspect of the present invention, there is provided a start-up method for a digital broadcasting receiving apparatus including performing a booting operation related to a central processing unit (CPU) when the digital broadcasting receiving apparatus is powered on; performing a channel decoding operation related to a channel to be displayed while the CPU booting is being performed; and displaying the channel decoded by the channel decoding operation when the CPU booting and the channel decoding are finished.

The booting related to the CPU may include: initializing an entire system of the digital broadcasting receiving apparatus; initializing an operating system (OS) for operating the system; and at least one operation of initializing a task of the digital broadcasting receiving apparatus and initializing an application that is to be run on the OS.

The initializing of the system may include setting an operation clock of the digital broadcasting receiving apparatus, and initializing a built-in memory of the digital broadcasting receiving apparatus.

The initializing of the task and the application may include initializing at least one of a record storing task, an audio coding task, a video coding task and a display task.

The channel decoding may include: extracting channel information stored in a nonvolatile memory with respect to a channel to be displayed after the CPU is initialized; decoding the channel using the extracted channel information while the CPU is being initialized; and providing a signal representing the channel decoding is finished to the CPU.

The providing of the signal representing that channel decoding is finished may include determining whether the CPU booting is finished or not; notifying the CPU that the channel decoding is finished when the CPU booting operation is not finished, and waiting until the CPU booting operation is finished; and providing the channel signal to the CPU after the booting operation is finished.

According to another aspect of the present invention, there is provided a digital broadcasting receiving apparatus including: a central processing unit (CPU) which is initialized when the digital broadcasting receiving apparatus is powered on; a nonvolatile memory storing channel information on a channel that is to be displayed after the CPU is initialized; a reset controller decoding the channel while the CPU is being initialized using the channel information of the channel stored in the nonvolatile memory, and providing a signal representing that a channel is decoded to the CPU.

When the digital broadcasting receiving apparatus is powered on, the CPU is applied for initializing an entire system of the digital broadcasting receiving apparatus, initializing an OS for operating the system of the broadcasting receiving apparatus, and initializing at least one of a task of the digital broadcasting receiving apparatus and an application that is to be run on the OS.

The CPU may be further applied so as to set an operating clock signal of the digital broadcasting receiving apparatus, and to initialize a built-in memory of the digital broadcasting receiving apparatus.

The CPU may be further applied so as to initialize at least one of a record storing task, an audio coding task, a video coding task and a display task.

The reset controller may be applied for extracting channel information in a nonvolatile memory with respect to a channel that is to be displayed after the CPU is initialized, performing decoding of the channel while the CPU is being initialized using the extracted channel information, and providing a decoded channel signal to the CPU.

The channel information may include at least one of identification information, sound setting information and image setting information.

The sound setting information may include at least one of a sound field effect and volume, and the image setting information may comprise at least one of aspect ratio, brightness and contrast.

The reset controller may further include an interrupt service routine determining whether a CPU booting operation is finished or not, and notifying the CPU that a channel decoding operation is finished when the CPU booting operation is not finished, and the reset controller is further applied so as to provide the channel signal to the CPU after the CPU booting operation.

BRIEF DESCRIPTION OF THE DRAWINGS

The above and other aspects of the present invention will become more apparent by describing in detail exemplary embodiments thereof with reference to the attached drawings in which.

Figure 1:
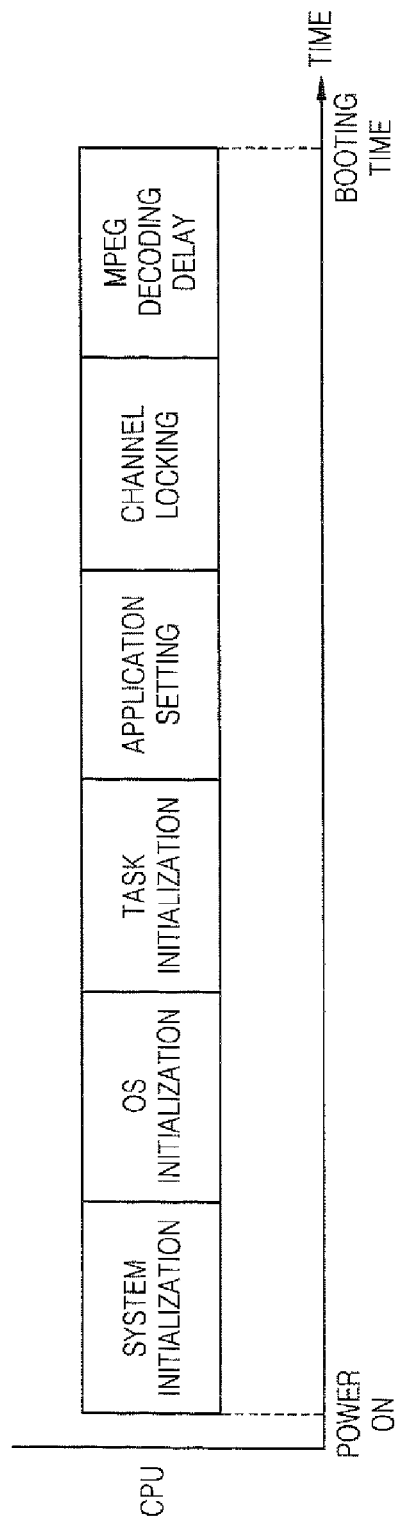
FIG. 1 is a view illustrating start-up time of a related art digital broadcasting receiving apparatus.

DETAILED DESCRIPTION OF THE
EXEMPLARY EMBODIMENTS OF THE
INVENTION

The present invention will now be described more fully with reference to the accompanying drawings, in which exemplary embodiments of the invention are shown. The invention may, however, be embodied in many different forms and should not be construed as being limited to the exemplary embodiments set forth herein; rather, these exemplary embodiments are provided so that this disclosure will be thorough and complete, and will fully convey the concept of the invention to those skilled in the art. Like reference numerals in the drawings denote like elements.

Figure 2:
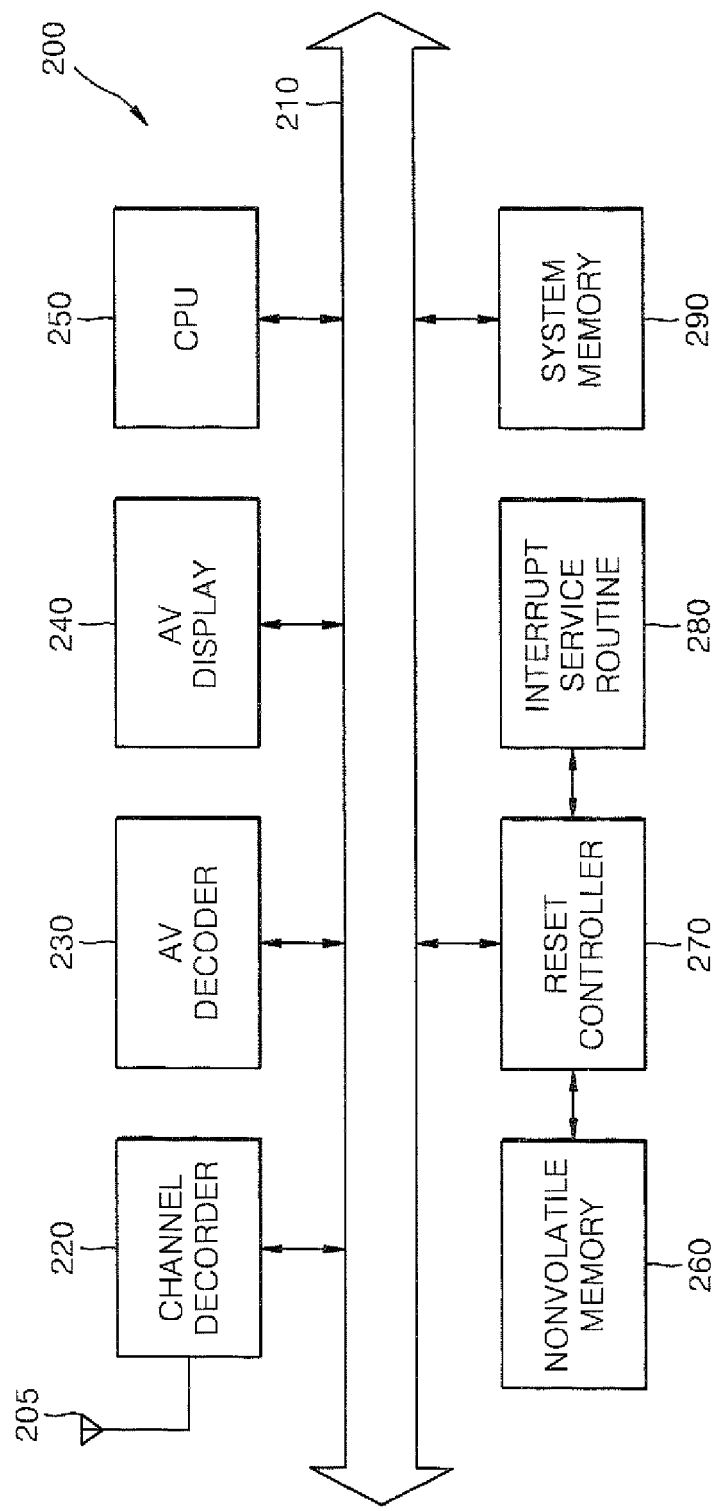
FIG. 2 is a block diagram illustrating a digital broadcasting receiving apparatus according to an exemplary embodiment of the present invention.

FIG. 2 is a block diagram illustrating a digital broadcasting receiving apparatus 200 according to an exemplary embodiment of the present invention.

The digital broadcasting receiving apparatus 200 includes an antenna 205, a channel decoder 220, an AV decoder 230, an AV display 240, a central processing unit (CPU) 250, a system bus 210, a nonvolatile memory 260, a reset controller 270, an interrupt service routine 280 and a system memory 290. Hereinafter, operations of each component module of the digital broadcasting receiving apparatus 200 will be described.

The channel decoder 220 receives a digital broadcasting signal from the antenna 205 and decodes the digital broadcasting signal. The channel decoder 220 is in charge of a locking operation in which a desired channel is selected from digital broadcasting signals. Channel locking corresponds to tuning used in analog broadcasting. In a channel locking operation, a desired channel signal is extracted from multiplexed digital broadcasting signals to be converted to a baseband signal. In order to perform such an operation, the channel decoder 220 may further include a tuner (not shown) tuning a digital broadcasting signal, and a transport stream decoder (not shown) dividing a tuned signal into audio/video signals and program specific information (PSI)/program and system information protocol (PSIP) information. The PSIP is a standard provided for keeping account of a program and data transmitted from a digital TV and for keeping account of information required for receiving TV signals. MPEG-2 System (ISO/IEC 13818-1) is an example of PSI. Advanced Television System Committee (ATSC)-standard 65 is an example of a PSIP. In particular, the PSIP is a set of tables developed so as to be operated in every transmit stream (TS) for a digital TV, and keeps account of information required for a virtual channel, which is transmitted in a TS, to provide information required for receiving television signals. A basic table includes a system time table (STT) for providing time information, a master guide table (MGT) for managing a transmitting table, a virtual channel table (VCT) for providing virtual channel information, a rating region table (RRT) for defining a level standard applicable to each region and country, etc. Extracted PSIP information can be saved in the system memory 290. When audio/video signals are divided by the channel decoder 220, the divided audio/video signals are decoded by the AV decoder 230. Then, the decoded audio/video signals are provided to the AV display 240 to be displayed and reproduced. Such serial operations are performed under control of the CPU 250.

The reset controller 270 is a device for shortening start-up time needed for power-on of the digital broadcasting receiving apparatus 200. Operations related to audio/video decoding of a channel are performed independently of a booting operation of the CPU 250 during serial booting operations. That is, the reset controller 270 divides a start-up operation of the digital broadcasting receiving apparatus 200 into a booting operation related to the CPU 250 and a booting operation related to channel decoding and simultaneously performs the separate operations. Thus, start-up time can be remarkably reduced compared with a related art in which such operations are sequentially performed.

The reset controller 270 operates autonomously and independently from the CPU 250 when the digital broadcasting receiving apparatus 200 is powered on. That is, the reset controller 270 selects an image to be initially displayed after the digital broadcasting receiving apparatus 200 is powered on to simultaneously decode the image while the booting operation of the CPU 250 is being performed. Generally, the image to be initially displayed after the digital broadcasting receiving apparatus 200 is powered-up is an image of the last channel watched by a user. Accordingly, the reset controller 270 reads from the nonvolatile memory 260 important information on the last channel selected by a user prior to power-off of the digital broadcasting receiving apparatus 200. The important information on the last channel is information required for displaying the last channel, for example, channel-related information such as a physical transmission channel (PTC) or the like, transport stream demultiplexer (TSD)-related information, audio-related information and video/display-related information. The TSD-related information is used for dividing a transport stream from a channel signal and transporting the transport stream to the AV decoder 230. That is, the reset controller 270 prepares in advance to display a channel to be initially displayed after booting of the CPU 250.

However, the channel to be initially displayed after booting of the CPU 250 is not limited to the last channel displayed by the digital broadcasting receiving apparatus 200, and can be a channel selected by a user, or an on screen display (OSD) for controlling the overall operation of the digital broadcasting receiving apparatus 200. When a decoding operation of the channel to be displayed is finished, the reset controller 270 notifies the CPU 250 that the decoding operation is finished, and as such the CPU 250 constituting a host outputs audio/video information prepared by a corresponding channel through the AV display 240.

In the digital broadcasting receiving apparatus 200, operations that can be performed by the reset controller 270 are not limited to the exemplified channel decoding operation. Preferably, the reset controller 270 can perform any operation that can be independently performed without interruption of the CPU 250 during booting of the CPU 250. In this way, the start-up time of the digital broadcasting receiving apparatus 200 can be reduced compared to when only the channel decoding operation is performed. Examples of operations that can be performed by the reset controller 270 will be described later with reference to FIG. 3.

During start-up of the digital broadcasting receiving apparatus 200, even after the decoding operation of the reset controller 270 is finished, the booting operation of the CPU 250 may not be finished yet. In this case, even if the reset controller 270 transmits a decoded channel signal to the CPU 250, the CPU 250 can not display a received channel signal. Thus, the reset controller 270 notifies the CPU 250 using the interrupt service routine 280 that the channel decoding operation is finished. The reset controller 270 notifies the CPU 250 using the interrupt service routine 280 since the CPU 250 and the reset controller 270 may communicate using an interrupt signal. That is, when the interrupt signal is received, the CPU 250 temporally stops a current operation, and interprets the received interrupt signal to perform a corresponding operation. Thus, when the interrupt signal is received from the interrupt service routine 280 during a booting operation of the CPU 250, the CPU 250 can continue to perform the uncompleted booting operation after the CPU 250 is notified that the channel decoding operation is finished. After the booting operation of the CPU 250 is finished, since the CPU 250 recognizes through the interrupt signal, which has already been received, that the channel decoding operation is already finished, the received channel signal is immediately displayed on the AV display 240.

That is, the interrupt service routine 280 is in charge of a handshaking operation between the CPU 250 and the reset controller 270. The interrupt service routine 280 will be described later with reference to FIGS. 4 and 5.

Referring to FIG. 2, the digital broadcasting receiving apparatus 200 decodes in advance a channel to be displayed using the reset controller 270 during booting of the CPU 250, and thus the start-up speed of the CPU 250 can be increased.

Figure 3:
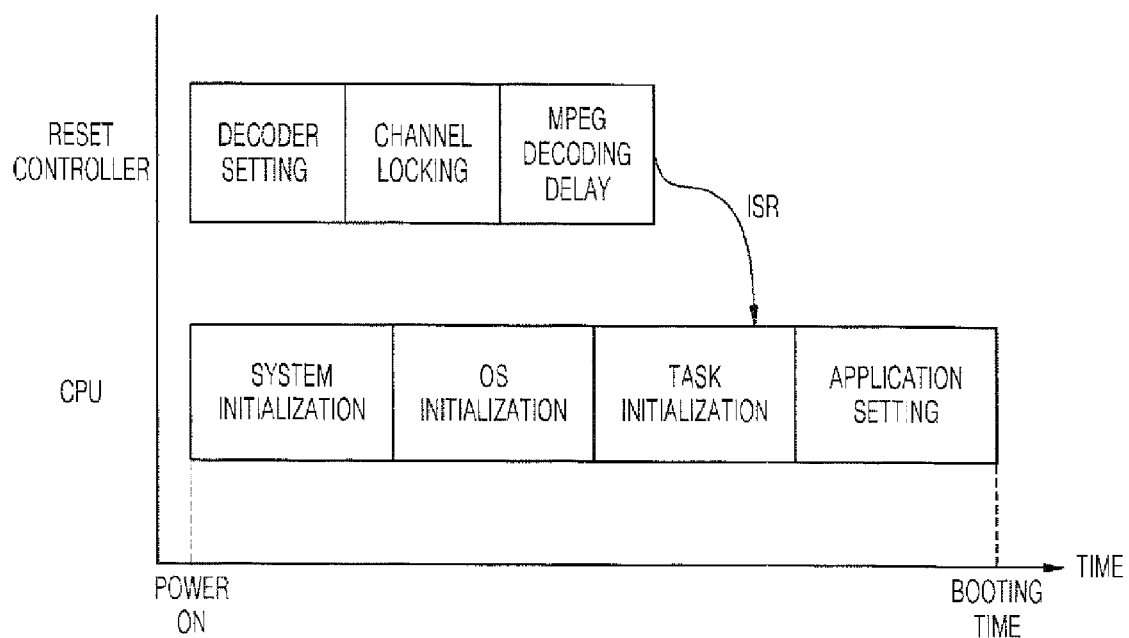
FIG. 3 is a view illustrating start-up time of a digital broadcasting receiving apparatus according to another exemplary embodiment of the present invention.

FIG. 3 is a view illustrating start-up time of a digital broadcasting receiving apparatus according to another exemplary embodiment of the present invention. The horizontal axis is time, and the vertical axis shows devices that perform an illustrated operation.

Referring to FIG. 3, when the digital broadcasting receiving apparatus is powered on, a CPU and a reset controller individually perform a booting operation. The CPU performs a system initialization operation, an operating system (OS) initialization operation, a task initialization operation and an application setting operation. Simultaneously, the reset controller performs a decoder setting operation, a channel locking operation and an MPEG decoding delay operation. In the decoder setting operation that is performed by the reset controller, a decoder (see channel decoder 220 of FIG. 2) for decoding a digital broadcasting signal received from an antenna is set to be in an operation wait state. That is, a header of the received digital broadcasting signal is analyzed, the kind of codec used in encoding and the properties of the digital broadcasting signal are determined, and the decoder is set to correspond to the kind of codec and the properties of the digital broadcasting signal. When the digital broadcasting signal is encoded using an MPEG codec, the MPEG decoding delay occurs when a digital broadcasting signal is decoded. When the MPEG decoding delay is finished, the reset controller transmits an interrupt signal to the CPU using an interrupt service routine (ISR).

As illustrated in FIG. 3, the booting operation of the reset controller is finished before the booting operation of the CPU is finished. Since the booting operation of the reset controller is finished before the booting operation of the CPU is finished, the reset controller does not directly transmit decoded channel information to the CPU, but waits after transmitting an interrupt signal to the CPU. When the booting operation of the CPU is finished, since the CPU recognizes through the pre-received interrupt signal that the booting operation of the reset controller has been finished, the CPU immediately receives the decoded channel information from the reset controller and displays the decoded channel information. If the booting operation of the reset controller is finished after the booting operation of the CPU is finished, the reset controller immediately transmits the decoded channel signal to the CPU rather than transmitting the interrupt signal. Thus, if the CPU has already finished the booting operation it can immediately display the received channel signal.

As illustrated in FIG. 3, since the booting operation of the CPU and the booting operation of the reset controller proceed simultaneously, the start-up time of the digital broadcasting receiving apparatus is remarkably reduced. The start-up times vary for different operation conditions and experimental conditions. However, since it takes about one second from the start of channel locking until an extracting operation for extracting a transport stream, about 0.3 seconds are needed for parsing of program specification information (PSI), about 0.7 seconds for the MPEG decoding delay, and about 33 ms for the response rate of a display, the booting time can be reduced by about 2 seconds.

Figure 4:
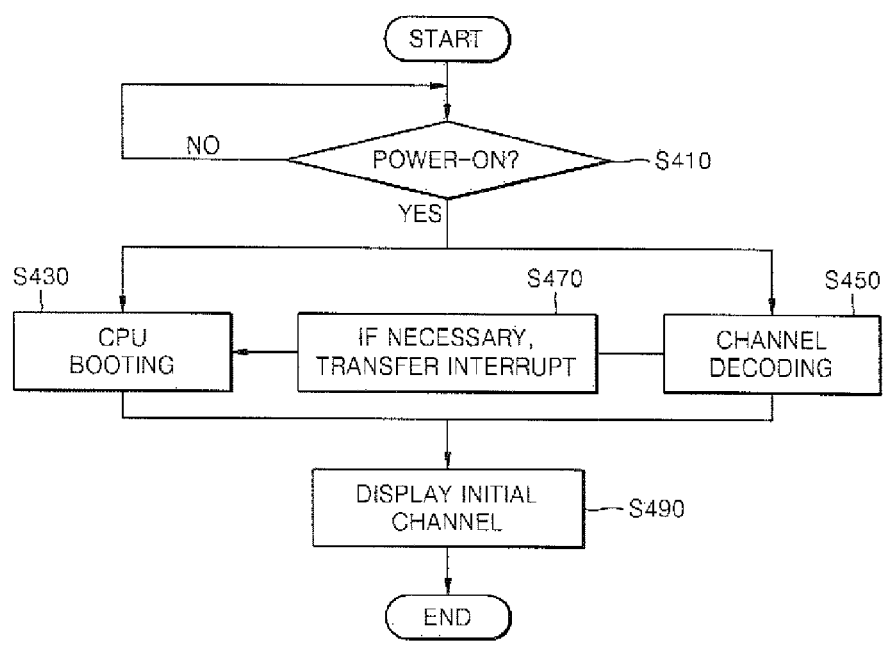
FIG. 4 is a flow chart illustrating a start-up method of a digital broadcasting receiving apparatus, according to an exemplary embodiment of the present invention.

FIG. 4 is a flow chart illustrating a start-up method of a digital broadcasting receiving apparatus, according to an exemplary embodiment of the present invention.

First, it is determined whether the digital broadcasting receiving apparatus is powered on or not S410. When the digital broadcasting receiving apparatus is powered on, a CPU booting operation S430 and a channel decoding operation S450 are simultaneously performed. As described above, the CPU booting operation S430 is a booting operation that can be performed only if the CPU participates in booting. The channel decoding operation S450 is a booting operation that can be independently performed by the reset controller without participation of the CPU.

When the channel decoding operation S450 is finished, the reset controller transmits the interrupt signal to the CPU if necessary. As described above, the interrupt signal is a signal representing that the channel decoding operation is already performed.

When the CPU booting operation S430 and the channel decoding operation S450 are finished, a decoded initial channel is decoded S490.

Figure 5:
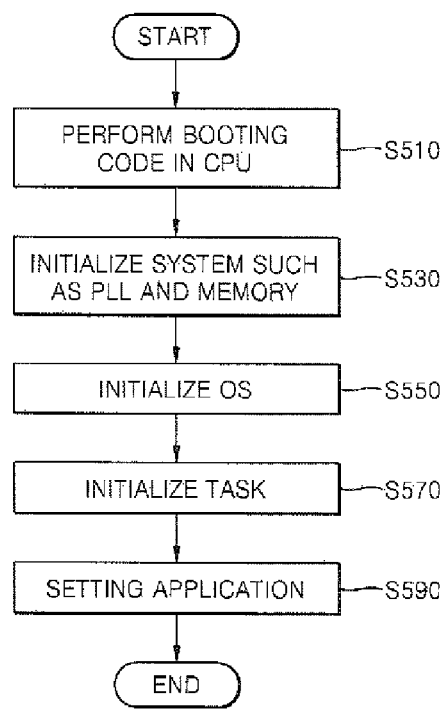
FIG. 5 is a flow chart illustrating a central processing unit (CPU) booting operation of the start-up method for the digital broadcasting receiving apparatus of FIG. 4.

FIG. 5 is a flow chart illustrating the CPU booting operation of the start-up method for the digital broadcasting receiving apparatus of FIG. 4.

When the digital broadcasting receiving apparatus is powered on, the CPU performs a booting code S510. In the present exemplary embodiment, the booting code is an instruction that is to be initially performed during power-on. Then, the CPU initializes a phase locked loop (PLL) and a system device such as a system memory in the digital broadcasting receiving apparatus S530. When hardware in the digital broadcasting receiving apparatus is initialized, an OS is initialized S550. As described above, an OS based on Linux or a real time OS may be used as the OS of the digital broadcasting receiving apparatus.

When the OS initialization operation S550 is finished, a task and application that can be run on the OS are each initialized S570 and S590. Each of the operations illustrated in FIG. 5 are performed using the CPU.

Figure 6:
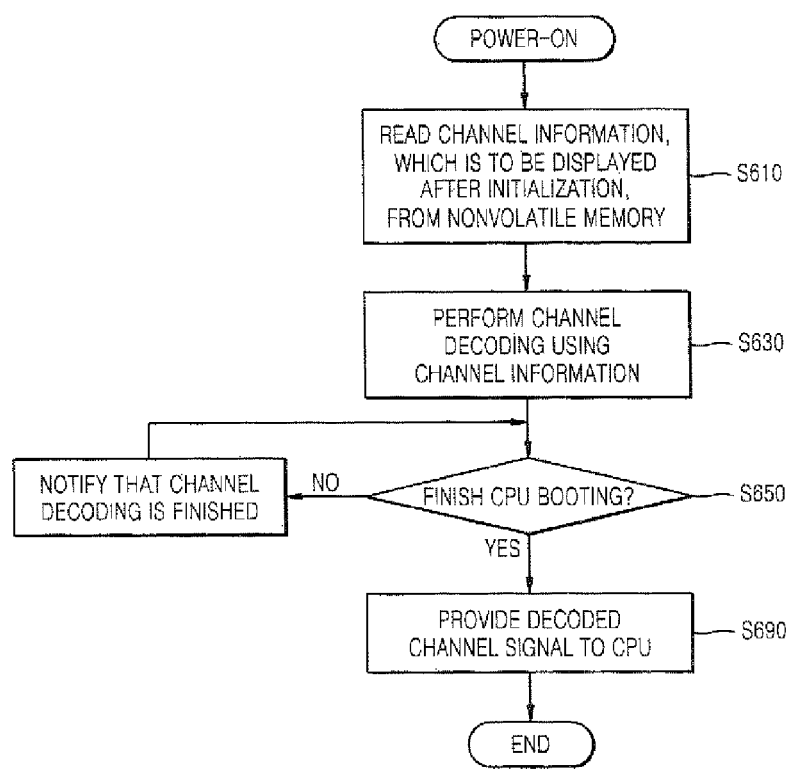
FIG. 6 is a flow chart illustrating a channel decoding operation of the start-up method for the digital broadcasting receiving apparatus of FIG. 4.

FIG. 6 is a flow chart illustrating a channel decoding operation of the start-up method for the digital broadcasting receiving apparatus of FIG. 4.

In S610, when the digital broadcasting receiving apparatus is powered on, channel information on a channel, which is to be initially displayed on the digital broadcasting receiving apparatus after a start-up operation is finished, is extracted from a nonvolatile memory. As described above, the channel that is initially displayed may be the channel that was last watched. However the initially displayed channel may be different. For example, when a user sets a wakeup time, the user may want to watch the same news channel regardless of the channel that was last watched. In this case, the channel that is to be initially displayed after the start-up operation of the digital broadcasting receiving apparatus is a news channel. In S630, when channel information of the channel that is initially displayed is extracted, a corresponding channel is decoded using the extracted channel information. As described above, the decoding operation can be performed using the channel decoder under the control of the reset controller. When the channel decoding is finished, it is determined whether the CPU booting operation is finished or not in S650. In S690, when the CPU booting operation is finished, the decoded channel signal is immediately transmitted to the CPU. Then, the CPU immediately displays the received channel signal. However, when the CPU booting operation is not finished, the CPU is notified that the channel decoding operation is finished, and a wait state is maintained. An interrupt service routine is used during this operation, as described above. Lastly, when the CPU booting operation is finished, the decoded channel signal is transmitted to the CPU, and the CPU immediately displays the received channel signal.

The operations illustrated in FIG. 6 can be independently performed without the participation of the CPU.

While the present invention has been particularly shown and described with reference to exemplary embodiments thereof, it will be understood by those of ordinary skill in the art that various changes in form and details may be made therein. For example, the digital broadcasting receiving apparatus receiving the digital broadcasting signal is described, but the present invention is not limited thereto, and can be used in various electric devices having functions of receiving the digital broadcasting signal.

Accordingly, the real technical scope of the exemplary embodiments of the present invention is determined according to the technical spirit of the appended claims.

According to the exemplary embodiments of the present invention, the start-up time required for power-on of the digital broadcasting receiving apparatus can be remarkably reduced.

In addition, according to the exemplary embodiments of the present invention, the digital broadcasting receiving apparatus is quickly started by reducing the start-up time of the digital broadcasting receiving apparatus, and thus a delay experienced by a user can be reduced in order to improve user convenience.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A start-up method for a digital broadcasting receiving apparatus, the start-up method comprising:
    performing a booting operation related to a central processing unit (CPU) when the digital broadcasting receiving apparatus is powered on and, during the booting operation, performing a channel decoding operation including extracting channel information stored in a nonvolatile memory and digitally decoding a channel based on the extracted channel information;
    when the digital decoding of the channel is completed, sending an interrupt signal to the CPU; and
    displaying a decoded channel signal when the booting operation and the decoding operation are finished,
    wherein sending the interrupt comprises notifying to the CPU that the channel decoding operation is finished by sending a signal representing that the digital decoding of the channel is finished to the CPU if the booting operation is not finished.

2. The method of claim 1, wherein the booting operation related to the CPU comprises:
    initializing an entire system of the digital broadcasting receiving apparatus;
    initializing an operating system (OS) for operating the system of the digital broadcasting receiving apparatus; and
    initializing a task of the digital broadcasting receiving apparatus.

3. The method of claim 2, wherein the booting operation further comprises initializing an application that is to be run on the OS.

4. The method of claim 2, wherein the initializing of the entire system comprises setting an operation clock of the digital broadcasting receiving apparatus, and initializing a built-in memory of the digital broadcasting receiving apparatus.

5. The method of claim 3, wherein the initializing of the task and the initializing of the application comprises initializing at least one of a record storing task, an audio coding task, a video coding task and a display task.

6. The method of claim 1, wherein the channel information comprises at least one of identification information, sound setting information and image setting information.

7. The method of claim 6, wherein the sound setting information comprises at least one of a sound field effect and volume, and the image setting information comprises at least one of aspect ratio, brightness and contrast.

8. The method of claim 1, wherein determining whether the booting operation is finished comprises:
    notifying the CPU that the digital decoding of the channel is finished if the booting operation is not finished, and waiting until the booting operation is finished; and
    providing the channel to be displayed to the after the booting operation is finished.

9. The method of claim 1, wherein sending the interrupt comprises:
    if the booting operation is finished, providing the channel decoded by the channel digital decoding operation to the CPU.

10. A digital broadcasting receiving apparatus, the apparatus comprising:
    a central processing unit (CPU) which is initialized when the digital broadcasting receiving apparatus is powered on;
    a nonvolatile memory which stores channel information; and
    a reset controller which, when the digital broadcast receiving apparatus is powered on, extracts the channel information stored in the nonvolatile memory and decodes a channel during the initializing of the CPU based on the extracted channel information;
    wherein the reset controller is configured to perform an interrupt operation with the CPU during the initializing of the CPU, and
    wherein the interrupt operation comprises if a CPU booting operation is not finished, a interrupt service routine notifies that the channel decoding operation is finished by sending a signal representing that the decoding of a channel is finished to the CPU.

11. The apparatus of claim 10, wherein when the digital broadcasting receiving apparatus is powered on, the CPU initializes an entire system of the digital broadcasting receiving apparatus, initializes an OS for operating the system, and initializes at least one of a task of the digital broadcasting receiving apparatus and an application that is to be run on the OS.

12. The apparatus of claim 11, wherein the CPU sets an operating clock signal of the digital broadcasting receiving apparatus, and initializes a built-in memory of the digital broadcasting receiving apparatus.

13. The apparatus of claim 11, wherein the CPU initializes at least one of a record storing task, an audio coding task, a video coding task and a display task.

14. The apparatus of claim 10, wherein the channel information comprises at least one of identification information, sound setting information and image setting information.

15. The apparatus of claim 14, wherein the sound setting information comprises at least one of a sound field effect and volume, and the image setting information comprises at least one of aspect ratio, brightness and contrast.

16. The apparatus of claim 10, wherein the interrupt operation comprises if the CPU booting operation is finished, the interrupt service routine provides the channel decoded by the channel decoding operation to the CPU.

17. A start-up method for a digital broadcasting receiving apparatus, the start-up method comprising:

performing, when the digital broadcasting receiving apparatus is powered on, a decoding operation including extracting channel information stored in a nonvolatile memory with respect to a previously watched channel stored prior to power-off of the digital broadcasting receiving apparatus and digitally decoding the channel based on the extracted channel information and, during the decoding operation, performing a booting operation related to a central processing unit (CPU);

when the digital decoding of the channel is finished, sending an interrupt to the CPU;

when the CPU finishes the booting operation following the receipt of the interrupt signal, immediately displaying a decoded channel signal, wherein sending the interrupt comprises notifying to the CPU that the channel decoding operation is finished by sending a signal representing that the digital decoding of the channel is finished to the CPU if the booting operation is not finished.

* * * * *